United States Patent
Miyairi et al.

(10) Patent No.: US 7,223,306 B2
(45) Date of Patent: May 29, 2007

(54) LASER APPARATUS, LASER IRRADIATION METHOD, AND MANUFACTURING METHOD OF SEMICONDUCTOR DEVICE

(75) Inventors: Hidekazu Miyairi, Tochigi (JP); Akihisa Shimomura, Kanagawa (JP); Tamae Takano, Kanagawa (JP); Masaki Koyama, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 390 days.

(21) Appl. No.: 10/663,671

(22) Filed: Sep. 17, 2003

(65) Prior Publication Data

US 2004/0203248 A1 Oct. 14, 2004

(30) Foreign Application Priority Data

Sep. 17, 2002 (JP) ............................. 2002-269655

(51) Int. Cl.
*C30B 25/12* (2006.01)
*C30B 25/14* (2006.01)

(52) U.S. Cl. .............................. 117/92; 117/7; 117/89; 117/904

(58) Field of Classification Search .................... 117/7, 117/10, 89, 92, 904
See application file for complete search history.

(56) References Cited

U.S. PATENT DOCUMENTS

| 4,092,530 A | 5/1978 | Wise |
| 5,157,676 A | 10/1992 | Wilcox |
| 5,856,880 A | 1/1999 | Farina et al. |
| 6,059,873 A * | 5/2000 | Yamaguchi et al. ............ 117/7 |
| 6,078,390 A | 6/2000 | Bengtsson |
| 6,091,047 A | 7/2000 | Miyakawa et al. |
| 6,166,845 A * | 12/2000 | Ito et al. ...................... 359/245 |
| 6,336,969 B1 * | 1/2002 | Yamaguchi et al. ............ 117/7 |
| 6,455,359 B1 * | 9/2002 | Yamazaki et al. .......... 438/166 |
| 6,707,031 B1 | 3/2004 | Weinberger et al. |
| 2004/0052279 A1 | 3/2004 | Miyairi et al. |

FOREIGN PATENT DOCUMENTS

JP 07-038180 A 2/1995

* cited by examiner

*Primary Examiner*—Felisa Hiteshew
(74) *Attorney, Agent, or Firm*—Nixon Peabody LLP; Jeffrey L. Costellia (57) ABSTRACT

It is an object to provide a laser apparatus, a laser irradiating method and a manufacturing method of a semiconductor device that can perform uniform a process with a laser beam to an object uniformly. The present invention provides a laser apparatus comprising an optical system for sampling a part of a laser beam emitted from an oscillator, a sensor for generating an electric signal including fluctuation in energy of the laser beam as a data from the part of the laser beam, a means for performing signal processing to the electrical signal to grasp a state of the fluctuation in energy of the laser beam, and controlling a relative speed of an beam spot of the laser beam to an object in order to change in phase with the fluctuation in energy of the laser beam.

12 Claims, 13 Drawing Sheets

Fig.1

Fig. 2A (oscillation frequency:10Hz)

Fig. 2B (oscillation frequency:20Hz)

Fig. 2C (oscillation frequency:30Hz)

Fig. 2D (oscillation frequency:40Hz)

Fig. 2E (oscillation frequency: 50Hz)

LASER APPARATUS, LASER IRRADIATION METHOD, AND MANUFACTURING METHOD OF SEMICONDUCTOR DEVICE

BACKGROUND OF THE INVENTION

1. Field of the Invention

The present invention relates to a laser apparatus and a laser irradiation method, specially a laser apparatus and a laser irradiation method that have a function of stabilizing energy of an output laser beam. The present invention also relates to a manufacturing method of a semiconductor device including a step for crystallizing a semiconductor film with the laser apparatus and the laser irradiation method.

2. Description of the Related Arts

Lasers are classified into a gas laser and a solid laser according to a laser medium, and have various kinds. In lasers, obtained wavelengths, energy values and pulse characteristics are different depending on the laser mediums, and applications of lasers have been searched according to characteristics of laser beams. Of various lasers, YAG laser, $CO_2$ laser, excimer laser and the like are mainly used for many industrial laser apparatuses.

An excimer laser that is a gas laser emits intensive ultraviolet light and has a short wavelength of 0.193 μm (ArF) or 0.351 μm (XeF), and is superior in light condensing. Therefore, the excimer laser is suitable for a field in which a super microfabrication at μm level is required as typified by semiconductor manufacturing including mask forming, in addition to general processing of parts.

In a gas laser typified by an excimer laser or a $CO_2$ laser, however, fluctuation in pressure of gas that is a laser medium is easily generated in an oscillator generally, and fluctuation in gas flow rate is also easily generated in the case of circulating gas of a laser medium in an electric discharge tube for oscillation. Consequently, there is a problem that it is difficult to stabilize energy of an output laser beam from the oscillator and to perform a process to an object uniformly.

Conventionally, fluctuation in pressure of a laser medium in a electric discharge tube is detected and another fluctuation in pressure for counteracting the fluctuation is generated to suppress the fluctuation in pressure or fluctuation in flow rate of the laser medium, in order to stabilize energy of an output laser beam (Reference 1: Japanese Patent Laid-Open No. Hei 07-038180).

The above reference 1 describes the following: fluctuation in pressure of gas that is laser medium is detected in a pressure sensor provided in a gas supplying duct and is input to a feedback control unit as a detection signal. A phase of the detection signal is inverted in the feedback control unit and the detection signal with the inverted phase is subjected to a frequency analysis with fast Fourier transform (FFT) in a waveform generator to obtain a waveform signal. After the waveform signal is amplified, it is input to a wave transducer. The wave transducer generates fluctuation in pressure, which has the inverted phase of and the same amplitude as that of the fluctuation in pressure detected by the pressure sensor, in accordance with the input amplified waveform to counteract the fluctuation in pressure of the laser medium.

SUMMARY OF THE INVENTION

The above method has a limit, however, to suppress fluctuation in pressure of a laser medium since it is difficult to accurately generate fluctuation in pressure with the inverted phase in a wave transducer. With respect to excimer laser, fluctuation in energy of an output laser beam is smaller than that of $CO_2$ laser shown in the above Reference 1. The excimer laser is widely used for microfabrication with an advantage of superiority in light condensing, however, so that it is desired that the excimer laser have higher stability than the $CO_2$ laser. Accordingly, in such method as the above method that the fluctuation in pressure of the laser medium is counteracted with a transducer, it is difficult that a level of stability in energy of the output laser beam reaches a satisfactory level.

When an output of a laser beam is not stable, it is difficult to perform a process to an object uniformly. For example, in crystallization of a semiconductor film with irradiation of a laser beam, it is thought that a difference in the crystallinity is generated due to ten percent of a subtle fluctuation in energy.

Figure 8A:
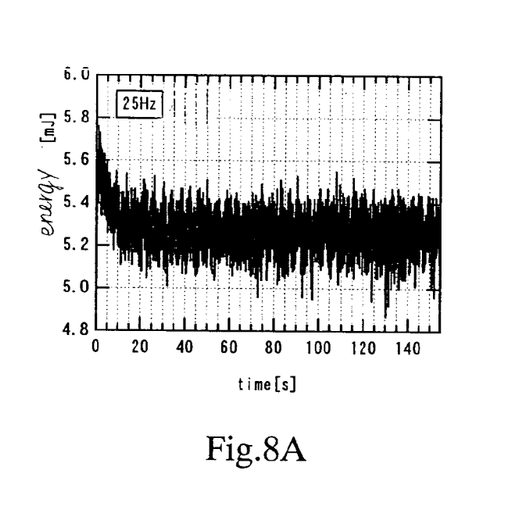
FIGS. 8A and 8B are a graph showing an energy value of a laser beam to time and a graph showing data after performing FFT, respectively.

The present inventors took a sample of a part of a laser beam output from an excimer laser with pulse oscillation and observed energy fluctuation. FIG. 8A shows an energy value of the sampled laser beam to time. It is noted that a frequency of the excimer laser is set at 25 Hz.

Figure 8B:
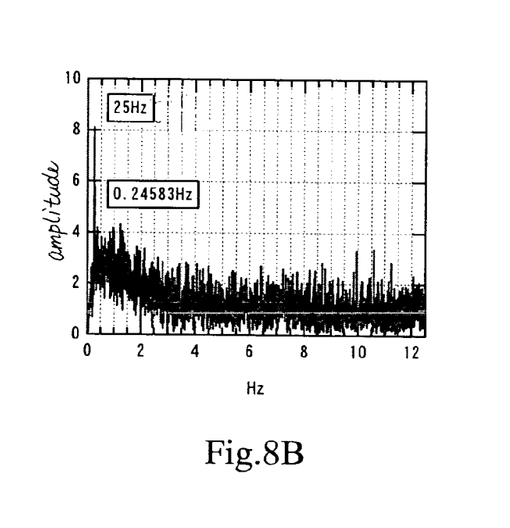

FIG. 8B shows data obtained by performing FFT to the data shown in FIG. 8A. In FIG. 8B, the horizontal axis shows frequency whereas the vertical axis shows amplitude. Of the data converted by FFT, by far the highest peak is observed at a frequency of 0.24583 Hz. This frequency corresponds to a frequency of a periodic fluctuation in energy of the laser beam observed in FIG. 8A.

Although the fluctuation in energy in a period from the start of measuring to 20 sec is larger than the other in FIG. 8A due to an excessive response of a detector of a measuring system, the data after converting by FFT is the same whether the data cut during this period is cut or not.

Assumed that the laser beam above with the fluctuation in energy is scanned at a speed of 0.8 mm/sec to crystallize a semiconductor film, the laser beam with the highest energy density is irradiated to the semiconductor film at the interval given by the formula, 0.8/0.24583≈3.3 mm.

Figure 9:
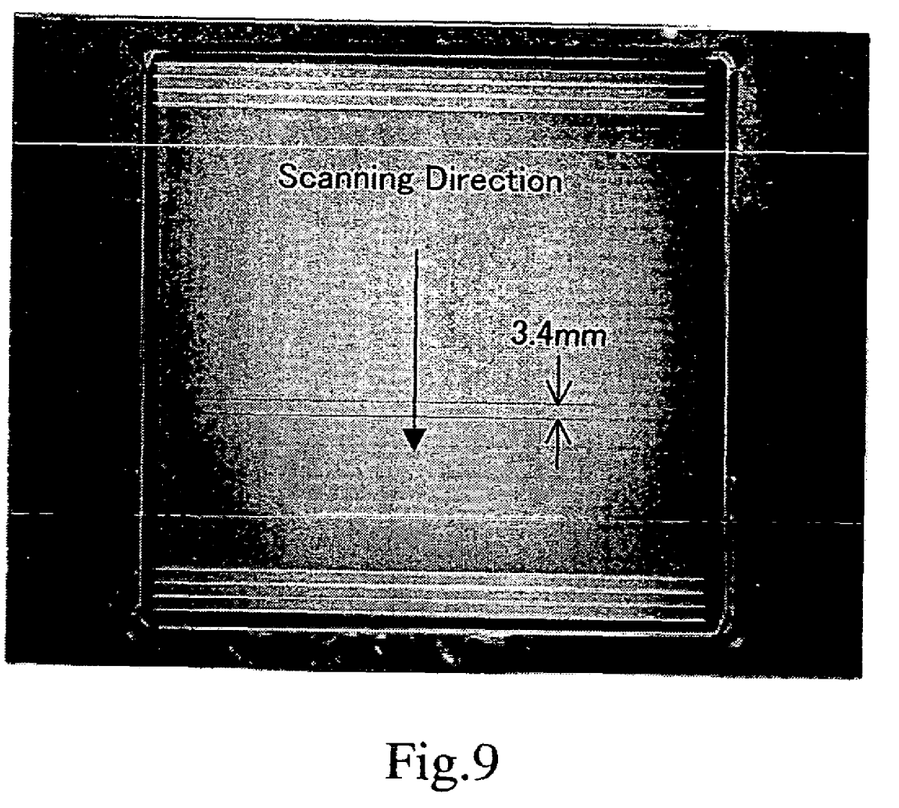
FIG. 9 is a photograph of a top view of a semiconductor film crystallized by irradiating a laser beam from an excimer laser.

FIG. 9 is a photograph of a top surface of a semiconductor film that is actually subjected to crystallization with irradiation of a laser beam of excimer laser. The laser beam of the excimer laser with a pulse oscillation is irradiated to the semiconductor film at oscillation frequency of 25 Hz and at a scanning speed of 0.8 mm/sec. In the photograph of the semiconductor film shown in FIG. 9, a plurality of lateral streaks caused due to a difference in crystallinity can be seen in the direction perpendicular to the scanning direction denoted by an arrow. The plurality of lateral streaks are shown with an interval of 3.4 mm, which is almost the same as the value (3.3 mm) obtained according to the above-mentioned formula. Therefore, the plurality of lateral streaks are caused due to a periodic fluctuation in energy of the laser beam.

Figure 10:
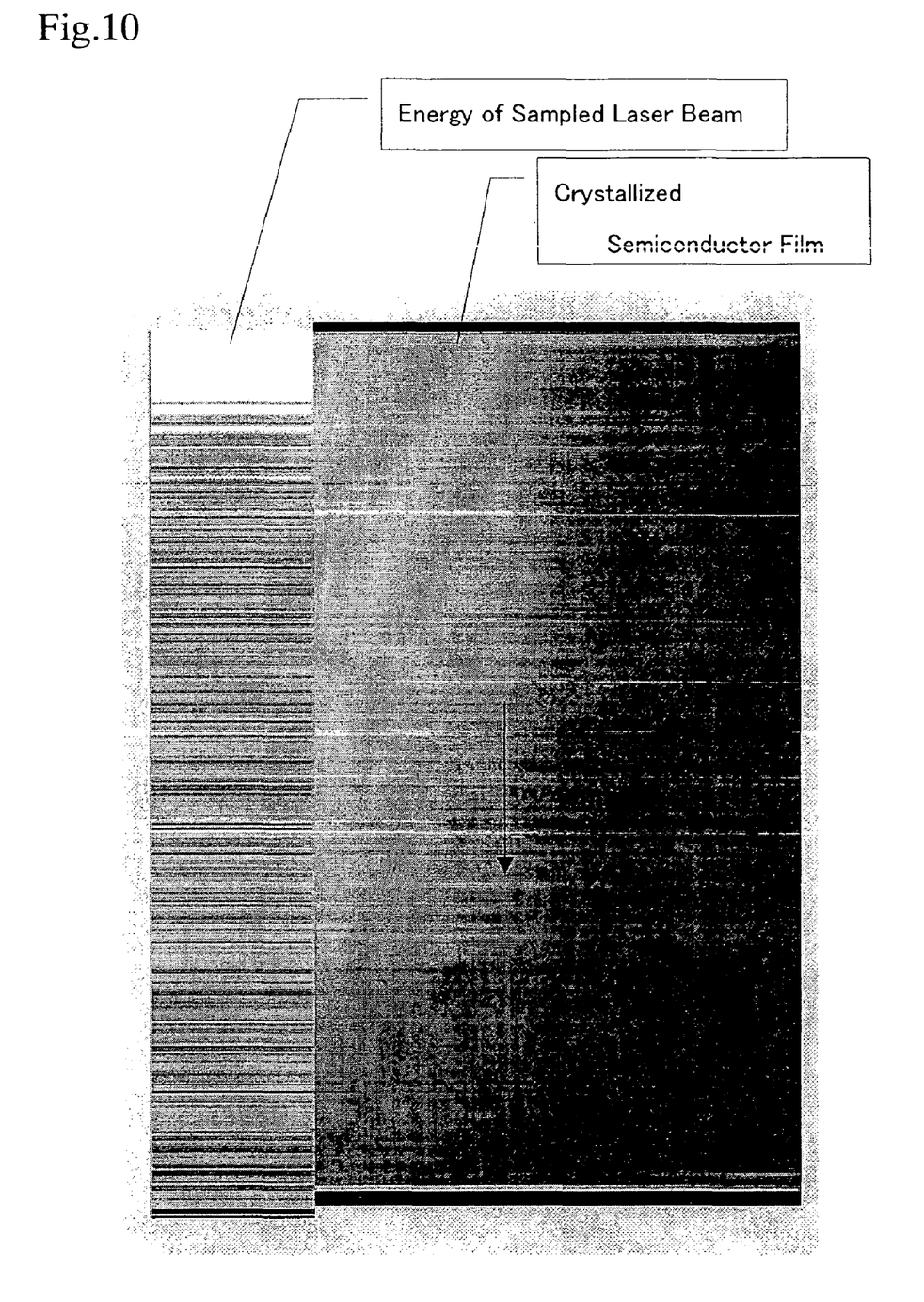
FIG. 10 shows a photograph of top view of a crystallized semiconductor film and a drawing showing an energy value of a laser beam with gradation.

Further, a photograph of the top surface of the crystallized semiconductor film and a drawing in which the energy value of a sampled part of the laser beam output from the excimer laser with pulse oscillation is shown with fifteen gradation are shown side by side in FIG. 10. The oscillation frequency of the laser beam in FIG. 10 is set to 30 Hz and the scanning speed is set to 1.0 mm/sec. The direction of scanning is the direction as the arrow shows.

As understood from in FIG. 10, a plurality of lateral streaks caused due to the difference in crystallinity can be seen in the crystallized semiconductor film, in the direction perpendicular to the scanning direction, and a plurality of lateral streaks caused due to periodic fluctuation in energy of the sampled laser beam are shown with the gradation that shows strength and weakness of energy. The two kinds of lateral streaks have the same interval. Therefore, FIG. 10 also shows that the plurality of lateral streaks caused due to the difference in crystallinity, observed in the semiconductor film, are resulted from periodic fluctuation in energy of the laser beam.

When a thin film transistor (TFT) is manufactured with the use of such semiconductor film with fluctuation in crystallinity, ON-current thereof is varied depending on a position in the semiconductor film. There is a problem that a region with high luminance and a region with low luminance are seen in striped shape in a light emitting device using the TFT as a transistor for controlling current supplied to a light emitting element.

Figure 11:
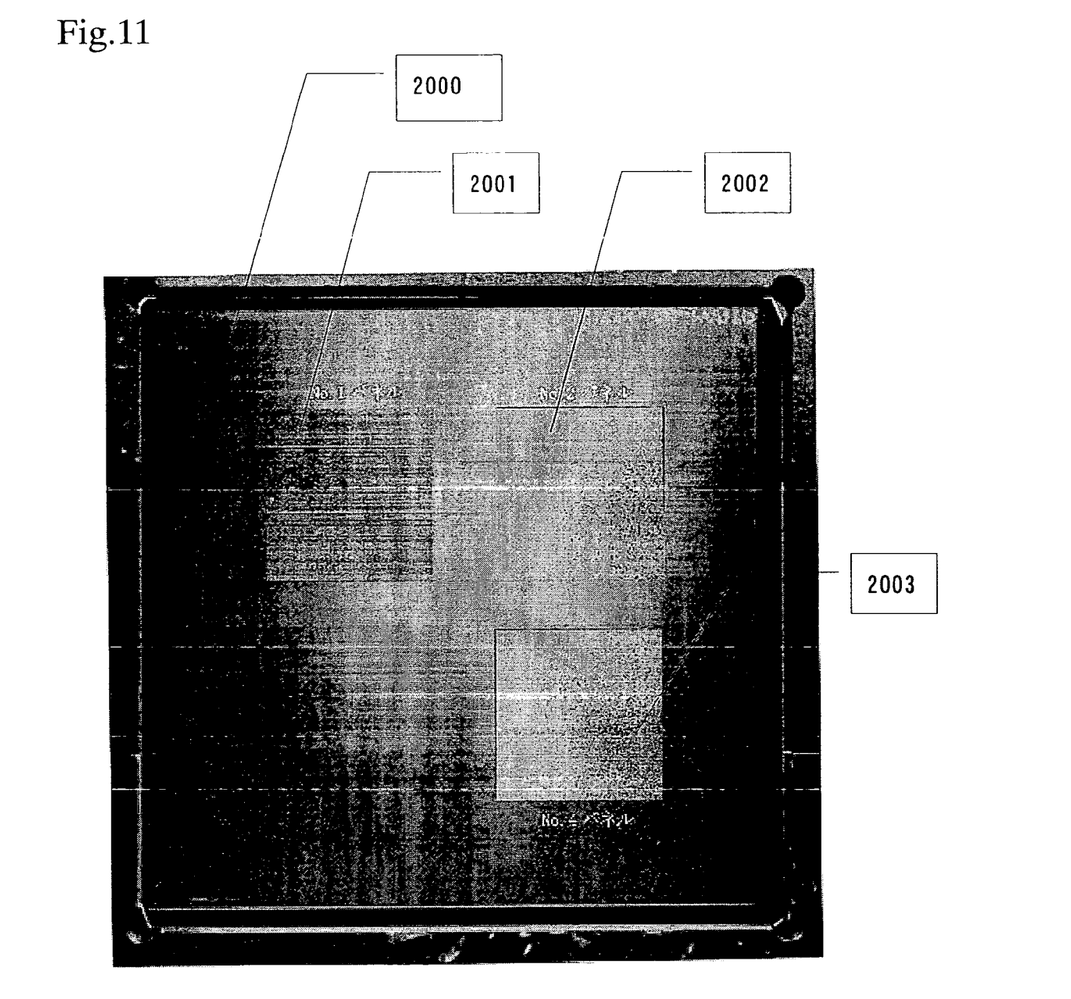
FIG. 11 is a photograph of top view of a crystallized semiconductor film and a photograph of a pixel portion in a light emitting device formed with the semiconductor film.

FIG. 11 shows a photograph of a top view of a semiconductor film crystallized with a laser beam and a photograph of a top view of a state in which a light emitting device using the semiconductor film white is displaying white on a whole area. Specifically, a plurality of pixels, each including a TFT formed with the crystallized semiconductor film and a light emitting element in which current to be supplied is controlled by the TFT, are provided in a pixel portion in the light emitting device. It is noted that an electroluminescent material is used in the light emitting element to obtain luminescence generated by applying electric field.

FIG. 11 is a photograph that shows parts of a pixel portion of the light emitting device 2001, 2002 and 2003 overlapped with a semiconductor film 2000 at positions corresponding to the semiconductor film 2000. The parts of the pixel portion of the light emitting device 2001, 2002 and 2003 have different gradations displayed from each other.

It is difficult to observe lateral streaks in the parts of the pixel portion of the light emitting device 2002 and 2003 whereas lateral streaks can be observed in the part of the pixel portion of the light emitting device 2001. The lateral streaks correspond with the lateral streaks of the semiconductor film. Therefore, it is observed that the plurality of lateral streaks in the display of the light emitting device are resulted from fluctuation in energy of the laser beam.

The present invention has been made in view of the above problems. It is an object of the present invention to provide a laser apparatus, a laser irradiation method that can perform a process to an object uniformly with the use of a laser beam.

The inventors of the present invention have thought of controlling a scan speed of a laser beam output from an oscillator to perform a process to an object more uniformly than the conventional means for reducing fluctuation in pressure and flow rate of a medium in a laser oscillator.

In the present invention, a part of a laser beam output from an oscillator is sampled to grasp fluctuation in energy of the laser beam. Then, data on the grasped fluctuation in energy is used to control a moving rate of an object in order to approach the state that total energy of the laser beam irradiated to the object per unit of time is constant.

Specifically, a correcting means included in a laser apparatus according to the present invention includes:

(1) means for sampling a part of a laser beam emitted from an oscillator (optical system);

(2) means for generating an electrical signal including fluctuation in energy of the laser beam as data using the sampled part of the laser beam with the optical system (sensor);

(3) means for performing signal processing to the electrical signal to grasp a state of the fluctuation in energy of the laser beam, and controlling a moving rate of an object in a direction opposite to a scanning direction of the laser beam (a relative speed of the object with respect to the laser beam) in order to change in phase with the fluctuation in energy of the laser beam (signal processing unit).

It is noted that the laser apparatus may also include (4) means for placing the object (stage) and (5) means for controlling a position of the stage (stage driver).

The control of the scan speed of the laser beam can be performed precisely, and a process to the object can be performed more uniformly according to the present invention than the conventional means with the wave transducer.

When the above laser apparatus is used for crystallizing a semiconductor film, the semiconductor film can have more uniform crystallinity. A manufacturing method of a semiconductor device according to the present invention can be used to manufacture integrated circuits and semiconductor display devices. In particular, in the case of being used for a semiconductor element such as a transistor provided in a pixel portion of a semiconductor display device, for example, a liquid crystal display device, a light emitting device which has in each pixel a light emitting element represented by an organic light emitting element, a DMD (Digital Micromirror Device), PDP (Plasma Display Panel), or an FED (Field Emission Display), lateral streaks due to energy distribution of an irradiated laser beam in the pixel portion is prevented from being recognized visually.

The present invention is applicable to not only excimer lasers and $CO_2$ lasers but also other gas lasers. In addition to gas lasers, the present invention can also be applied to solid lasers.

DESCRIPTION OF THE PREFERRED EMBODIMENTS

Embodiment Mode

Figure 1:
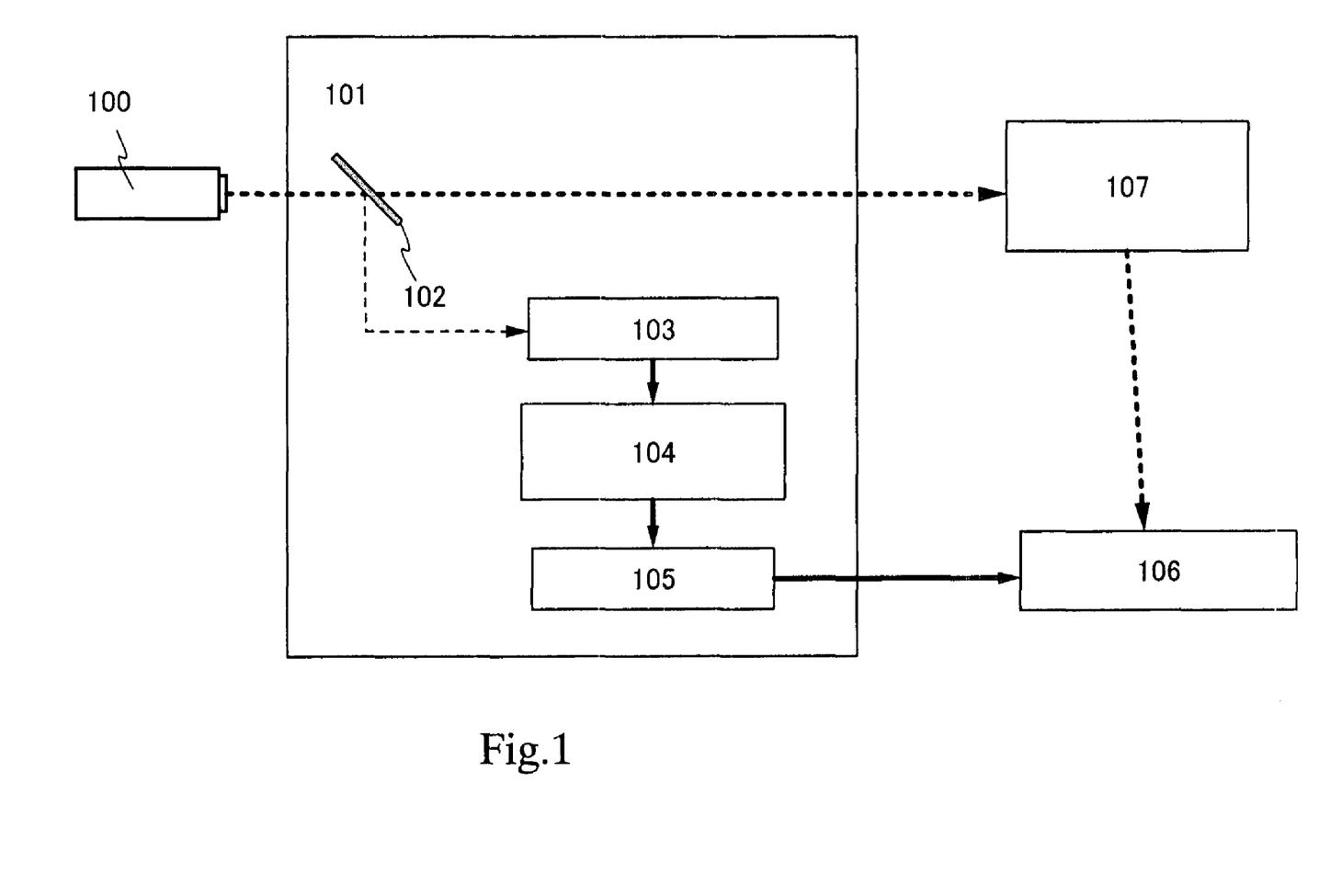
FIG. 1 is a block diagram showing a structure of a correcting means.

In the present embodiment mode, an explanation will be given on a configuration of a correcting means with a means for controlling a scan speed, included in a laser apparatus according to the present invention. FIG. 1 shows a block diagram of a correcting means 101 of the embodiment mode. The correcting means 101 shown in FIG. 1 has an optical system 102, a sensor 103, a signal processing unit 104, and a stage driver 105.

A laser beam emitted from an oscillator 100 has a light path controlled with the optical system 102 in order to sample a part of the laser beam to go into the sensor 103. The rest of the laser beam, except the sampled laser beam, is made to go into another optical system 107 that is different from the optical system 102 provided in the correcting means. The optical system 107 is used for processing a shape of a beam spot of the laser beam at an object on a stage 106. Hereinafter, in order to distinguish the two optical systems the optical system 102 provided in the correcting means 101 is referred to as a first optical system and the optical system 107 used as a means for processing a shape of a beam spot of the laser beam is referred to as a second optical system.

In the sensor 103, the part of the laser beam therein is converted into an electrical signal. The sensor 103 can be any photoelectric conversion element as long as the photoelectric conversion element is capable of generating an electric signal containing fluctuation in energy of the laser beam as data. For example, a photo diode, a photo transistor, and a CCD (charge coupled device) are employable.

FIGS. 2A to 2E are graphs showing fluctuation in energy of the sampled laser beam. Used here is a pulse oscillation excimer laser. The horizontal axis shows time (see) and the vertical axis shows the relative ratio (%) of an energy level at each point of measurement to the average of all of measured energy levels.

Figure 2A:
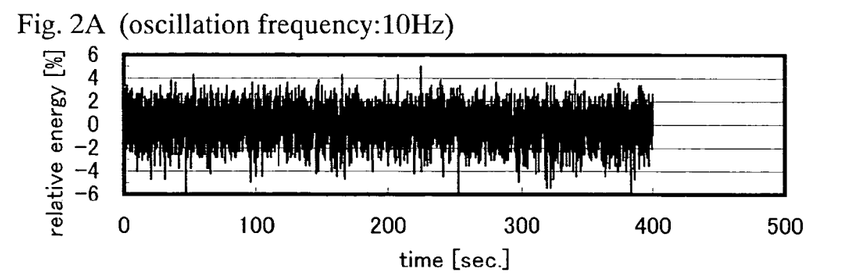
FIGS. 2A to 2E are graphs showing measured energy values corresponding with respect to oscillation frequencies.
Figure 2B:
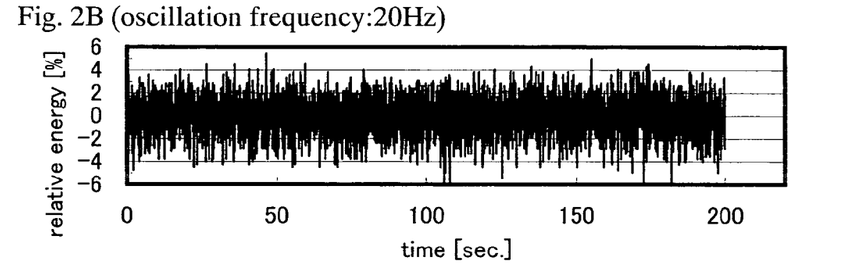
Figure 2C:
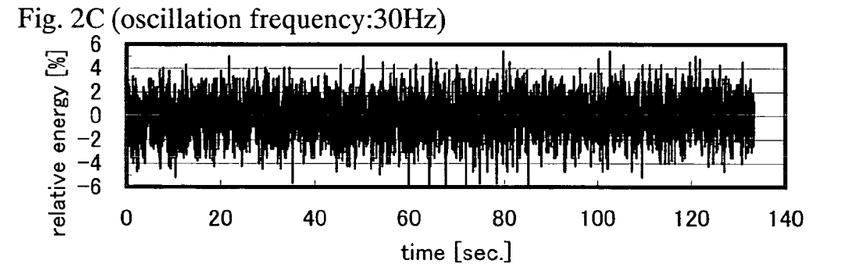
Figure 2D:
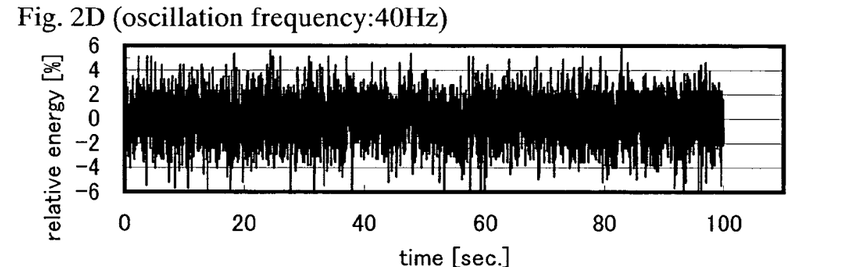
Figure 2E:
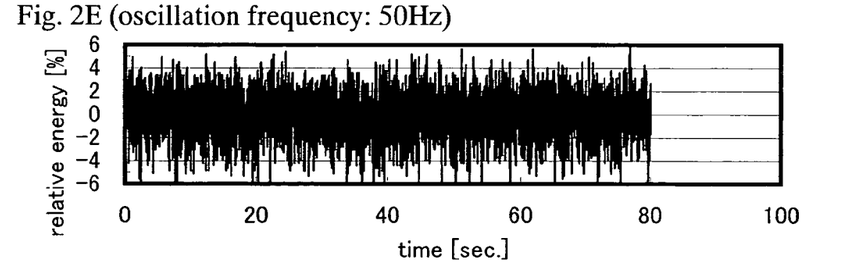
Figure 3A:
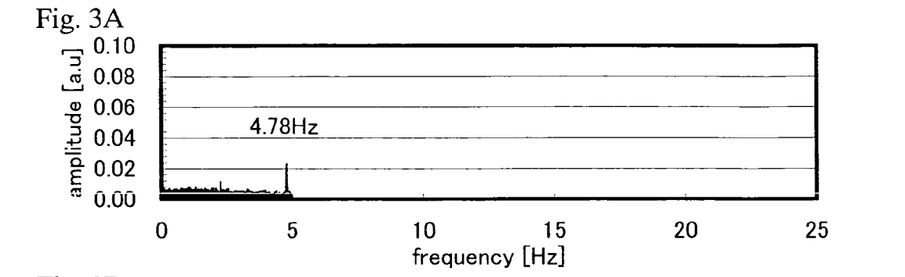
FIGS. 3A to 3E are graphs showing data after performing FFT to the measured energy values with respect to the oscillation frequencies.
Figure 3B:
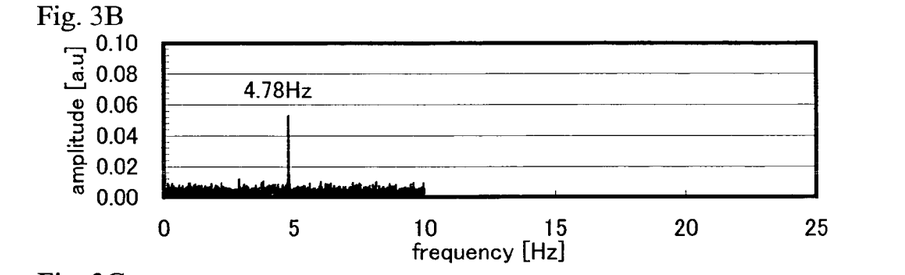
Figure 3C:
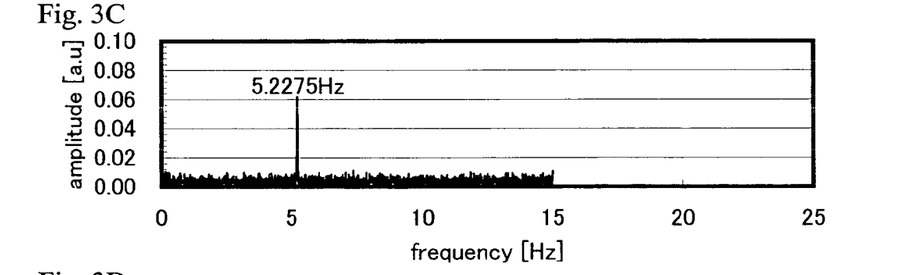
Figure 3D:
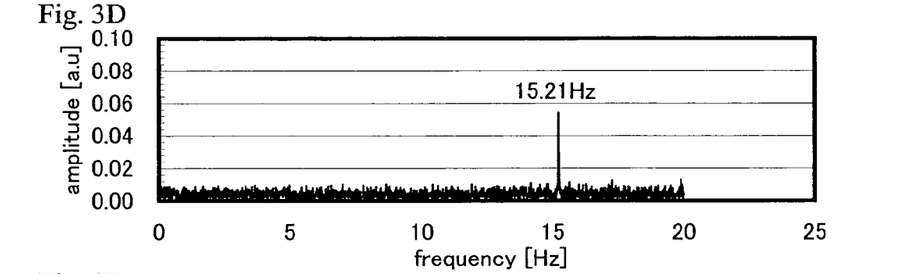
Figure 3E:
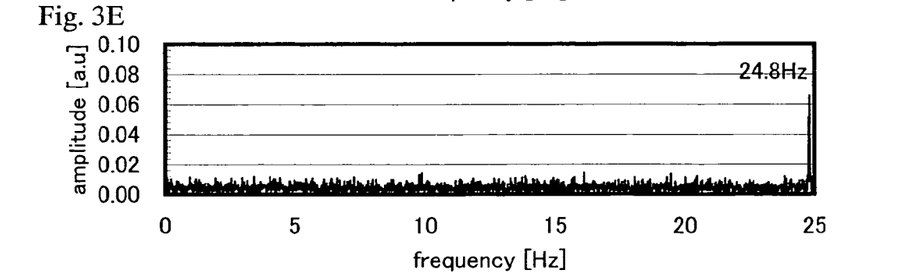

The laser beam has an oscillation frequency of 10 Hz in FIG. 2A, 20 Hz in FIG. 2B, 30 Hz in FIG. 2C, 40 Hz in FIG. 2D, or 50 Hz in FIG. 2E.

In the signal processing unit 104, signal processing is performed to the input electric signal. Of the fluctuation in energy of the laser beam, periodic fluctuation is analyzed. For the signal processing, fast Fourier transformation and other various methods can be employed. The signal processing has to produce at least the frequency and the amplitude of the periodic fluctuation of the fluctuation in energy of the laser beam. The case of using fast Fourier transformation for the signal processing will be described here.

Fast Fourier transformation is conducted using computation program software IGOR Pro, a product of WaveMetrix, Inc. in accordance with the following Formula 1.

$$Fk = \sum_{m=0}^{N-1} fmW^{km}$$ [Formula 1]

$$(W = e^{2\pi i/n})$$

It is possible to obtain the frequency with the highest peak and the peak level when frequency analysis according to fast Fourier transformation is conducted. This frequency corresponds to the periodic fluctuation of the fluctuation in energy of the laser beam. Hereinafter, this frequency is referred to as periodic frequency. The relative peak level at the periodic frequency corresponds to the amplitude of the periodic fluctuation.

FIGS. 3A to 3E show data obtained after performing fast Fourier transformation to the data of FIGS. 2A to 2E. FIG. 3A, FIG. 3B, FIG. 3C, FIG. 3D, and FIG. 3E correspond to FIG. 2A, FIG. 2B, FIG. 2C, FIG. 2D, and FIG. 2E, respectively. The horizontal axis shows frequency (Hz) and the vertical axis shows amplitude.

Each of the graphs of FIGS. 3A to 3E has one extraordinarily high peak. Specifically, the peak is observed at 4.78 Hz in FIG. 3A, 4.78 Hz in FIG. 3B, 5.2275 Hz in FIG. 3C, 15.21 Hz in FIG. 3D, or 24.8 Hz in FIG. 3E. Each of these peak frequencies is corresponding to the periodic frequency.

The electrical signal including the periodic frequency as information is input in the signal processing unit 104 where the stage driver 105 is controlled in accordance with the periodic frequency to move the stage 106 in order to change a moving rate of the stage in one direction (Specifically, in a direction opposite to a scanning direction of the laser beam) in accordance with the same frequency as and in phase with the periodic fluctuation of the laser beam.

Figure 4A:
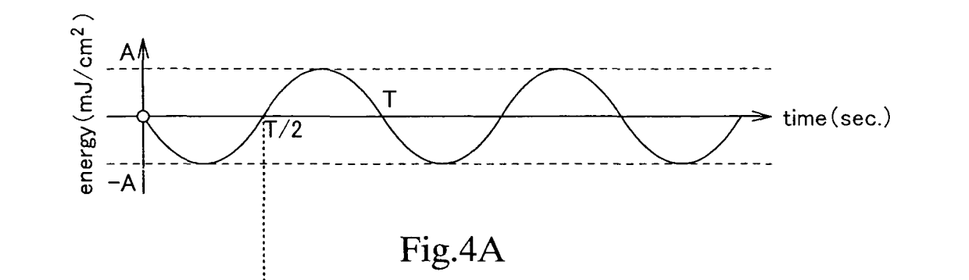
FIGS. 4A and 4B are graphs showing periodic fluctuation in energy and fluctuation in speed.
Figure 4B:
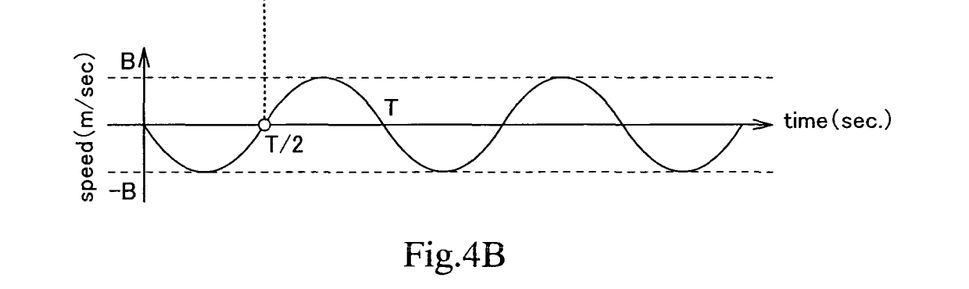

FIG. 4A shows a waveform depicting periodic fluctuation in energy of the laser beam, which is calculated with fast Fourier transformation. When the periodic frequency is given as "1/T", and the cycle of the periodic fluctuation is expressed as "T". The amplitude of the periodic fluctuation of the laser beam is represented by "A". FIG. 4B shows a waveform depicting fluctuation in speed of the stage, which is generated from the waveform depicting the periodic fluctuation shown in FIG. 4A. The waveform depicting the periodic fluctuation and the waveform depicting fluctuation in speed of the stage in one direction have the same cycle "T", and are in phase with each other. The amplitude of the speed of the stage is given as "B".

It is most preferable that the amplitude of the speed of the stage 106 is set in order to approach more the state that total energy of the laser beam irradiated per unit of time is constant. It is possible to adjust the amplitude of the speed of the stage in accordance with the peak intensity of the laser beam obtained according to FFT and the ratio of energy of the laser beam into the sensor 103 to the other laser beam into the optical system 107.

Next, it will be explained how to adjust a phase of a speed of a stage to a phase of fluctuation of a laser beam. There are various methods for adjusting the phases. In the embodiment mode, a phase of the speed of the stage 106 may be adjusted to a phase of energy of an uncorrected laser beam with a signal in synchronization with the oscillation of the laser beam from the oscillator as a standard. Specifically, the phase difference between the two phases is calculated using a signal (a standard signal) with a predetermined frequency and a predetermined phase difference from fluctuation of the uncorrected laser beam and periodic frequency of the uncorrected laser beam in order to adjustment the phase.

Figure 5A:
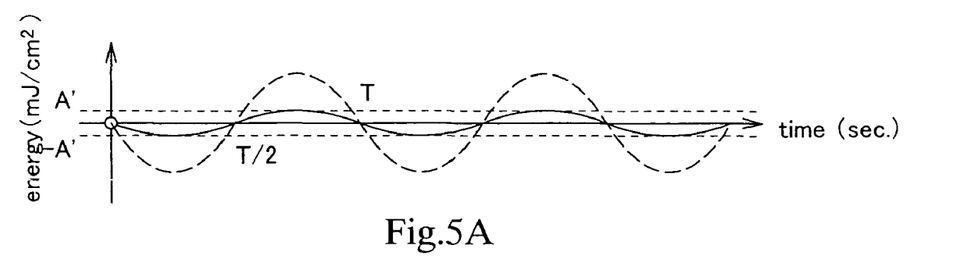
FIGS. 5A and 5B are graphs showing waveforms of an uncorrected laser beam and a corrected laser beam.

FIG. 5A shows the case of an ideal phase difference between a phase of fluctuation of a laser beam and a phase of a speed of a stage, where a waveform of an uncorrected laser beam is indicated by a dashed line and a waveform of a corrected laser beam is indicated by a solid line. Note that the waveform in FIG. 5A do not reflect fluctuation that takes place at a frequency lower than the oscillation frequency in order to make the waveform of periodic fluctuation clearer. In FIG. 5A, the waveform of the uncorrected laser beam and the waveform of the corrected laser beam are in phase with each other. It is therefore inferred that the phase of fluctuation of the speed is set just in phase with the phase of the periodic fluctuation of the uncorrected laser beam. Then, when the amplitude of the speed is adjusted so that the amplitude A' of the corrected laser beam becomes smaller, it is possible to improve more the stability of the energy of the corrected laser beam.

Figure 5B:
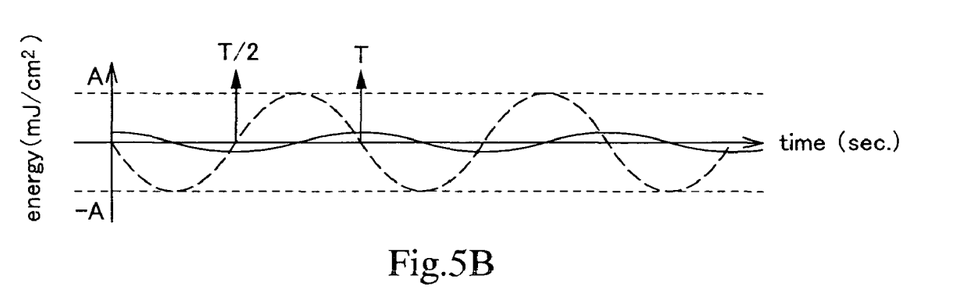

FIG. 5B shows the case that a phase of fluctuation of a laser beam and a phase of a speed of a stage are out of phase with each other, where a waveform of an uncorrected laser beam is indicated by a dashed line and a waveform of a corrected laser beam is indicated by a solid line. Note that, similarly to FIG. 5A, the waveforms in FIG. 5B do not reflect fluctuation that takes place at a frequency lower than the oscillation frequency in order to make the waveforms of periodic fluctuation clearer. In FIG. 5B, the waveform of the uncorrected laser beam and the waveform of the corrected laser beam are out of phase with each other. It is therefore inferred that the phase of fluctuation of the speed and the phase of the periodic fluctuation of the uncorrected laser beam are out of phase with each other. In this case, the phase of the speed is corrected additionally in the signal processing unit to prevent the periodic fluctuation of the corrected laser beam.

Figure 12A:
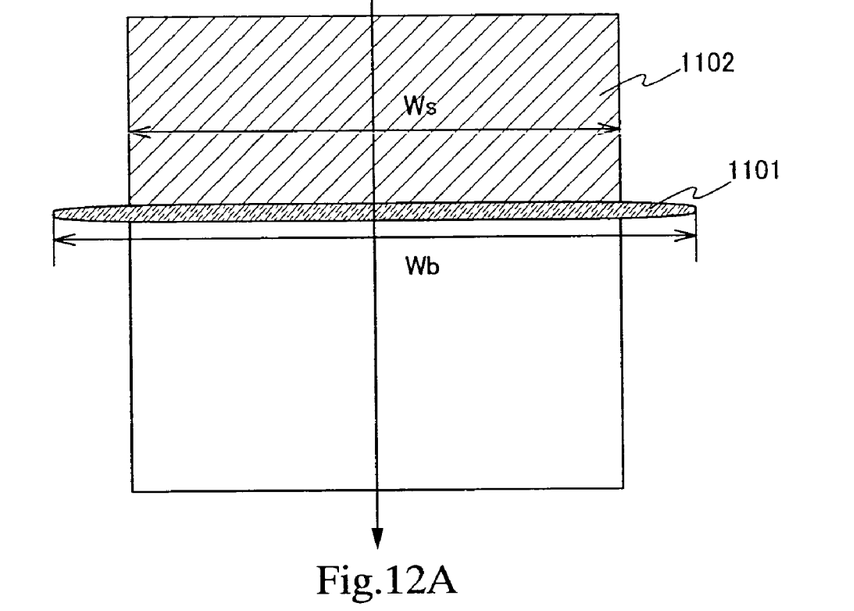
FIGS. 12A and 12B are diagrams showing a relationship between a beam spot of a laser beam and a width of an object.
Figure 12B:
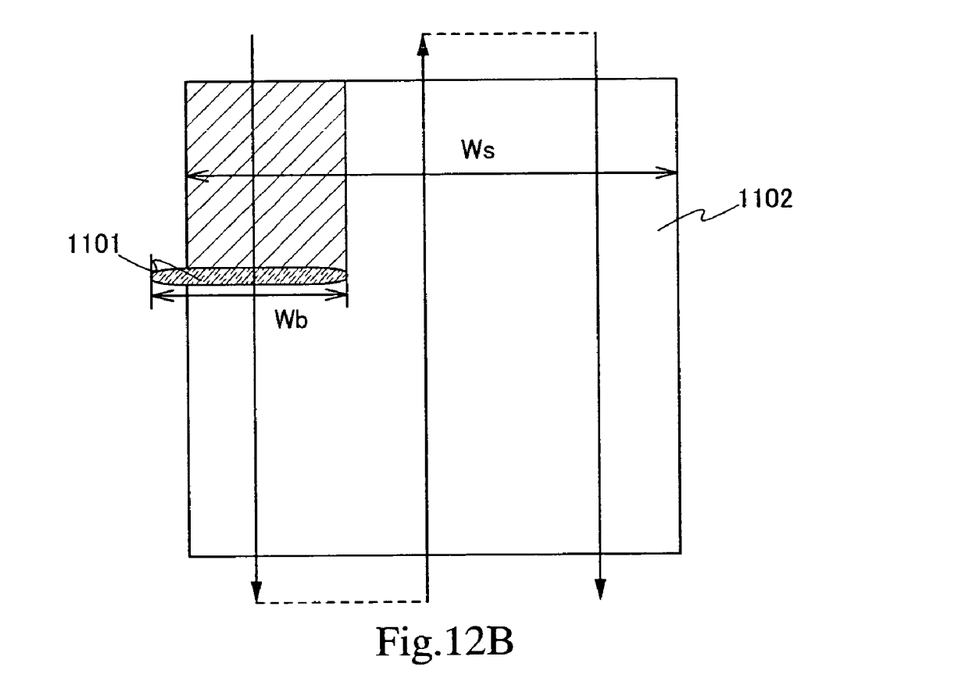

In the case that a width Wb of a beam spot 1101 is longer than a width Ws of an object 1102 in a direction perpendicular to a scanning direction shown by an arrow, as shown in FIG. 12A, what is necessary is to perform scanning once with a laser beam in the scanning direction. On the other hand, in the case that the width Wb of the beam spot 1101 is shorter than the width Ws of the object 1102 in the direction perpendicular to scanning directions shown by arrows, as shown in FIG. 12B, what is necessary is to perform scanning with a laser beam in the scanning direction several times. In any case, a speed of the stage at each scanning is controlled to fluctuate in phase with periodic fluctuation of the laser beam.

In this way, it is possible to approach the state that total energy of the laser beam irradiated to the object set on the stage 106 from the second optical system per unit of time is constant, and therefore, a process to the object can be performed more uniformly.

The correcting means above may have a memory or the like for storing information regarding the frequency and the amplitude of the fluctuation of the speed of the stage 106, which is determined in the signal processing unit. With such memory, it is not necessary to adjust the frequency and the amplitude of the fluctuation of the speed of the stage 106 from the next time on.

As methods for scanning a laser beam, there are an irradiation system moving type method in which an object is fixed while an irradiated position of a laser beam is moved, an object moving type method in which an irradiated position of a laser beam is fixed while an object is moved, and a method of a combination of the two methods.

Although the correcting means mentioned above is used for a laser apparatus with the object moving type, the present invention is not limited thereto. The correcting means according to the present invention can be also used for a laser apparatus with the irradiation system moving type and a laser apparatus with a combination of the object moving type and the irradiation system moving type.

In the case of the laser apparatus with the irradiation system moving type, a moving rate of the irradiated position is controlled in order to change in phase with fluctuation in energy of the laser beam. In any case briefly, according to the present invention, a relative moving rate of a beam spot to the object in a scanning direction is controlled in order to change in phase with fluctuation in energy of a laser beam.

The present invention can also prevent nonperiodic fluctuation in energy providing that a relative speed of a beam spot of a laser beam to an object can be controlled fast enough to make the laser beam reflect a monitoring result instantly.

[Embodiments]

Embodiments according to the present invention will be described below.

[Embodiment 1]

Periodic fluctuation in energy of a laser beam varies depending on an oscillation frequency of an oscillator. The present embodiment will give a description on the relation between an oscillation frequency of a laser beam emitted from an excimer laser oscillator and a frequency of periodic fluctuation.

Figure 6:
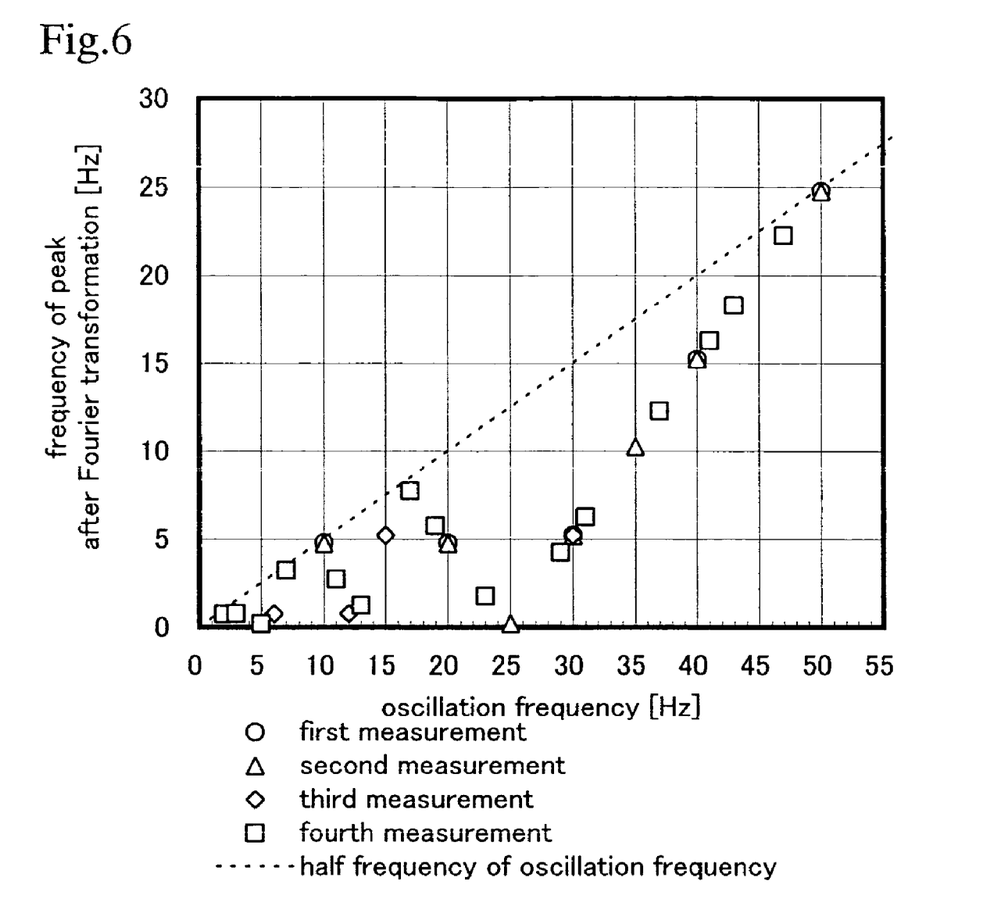
FIG. 6 is a graph showing a relationship between an oscillation frequency and a position of a peak of a frequency after performing Fourier transform.

FIG. 6 shows the relation between an oscillation frequency (Hz) of a laser beam and a frequency (Hz) of the highest peak obtained according to Fourier transformation. The horizontal axis indicates the oscillation frequency (Hz), and the vertical axis indicates the position (Hz) of the peak after Fourier transformation. Although measurements have been performed on different days, the same measurement conditions have been used except the oscillation frequency.

The frequency of the highest peak obtained according to Fourier transformation means the frequency of periodic fluctuation in energy of laser beam. The frequency of the periodic fluctuation repeatedly rises and drops in stages. Specifically, the frequency of the periodic fluctuation has a local minimal value when the oscillation frequency is about 5 Hz, 12 Hz, or 25 Hz and a local maximal value when the oscillation frequency is about 3 Hz, 10 Hz, or 17 Hz. After the oscillation frequency exceeds a point around 25 Hz, the frequency of the periodic fluctuation just continues to increase.

It is helpful for finding an optimum condition in actually performing irradiation of a laser beam to an object to study in advance the relation between the oscillation frequency and the frequency of the periodic fluctuation of the used laser beam as shown in FIG. 6. For instance, an interval between lateral streaks of a semiconductor film, which are caused due the periodic fluctuation, can be narrowed enough to avoid visual recognition when a condition that makes the frequency of the periodic fluctuation high is chosen. On the other hand, when a condition that makes the frequency of the periodic fluctuation low is chosen, an interval of between lateral streaks of a semiconductor film, which are caused due to the periodic fluctuation, can be widened so that no lateral streak can exist in an irradiated region.

Based on the data in FIG. 6, a predicted interval between lateral streaks is calculated for each oscillation frequency when a laser beam is irradiated in order to obtain the same shot number (about thirteen shots) as that under standard irradiation conditions of a laser beam (oscillation frequency: 30 Hz, scanning rate: 1.0 mm/sec), which are used in crystallization of a semiconductor film. Specifically, the calculation employs the following Formula 2.

$$d(w) = \frac{\omega}{\omega_0} \times \frac{v_0}{T(\omega)}$$ [Formula 2]

wherein d(ω) represents the interval of the lateral streaks, ω represents the oscillation frequency, $\omega_o$ represents the oscillation frequency under the standard irradiation conditions (=30 Hz), $v_o$ represents the scanning rate of a substrate under the standard irradiation conditions (=1.0 mm/sec), and T(ω) represents the frequency of periodic fluctuation.

Figure 13:
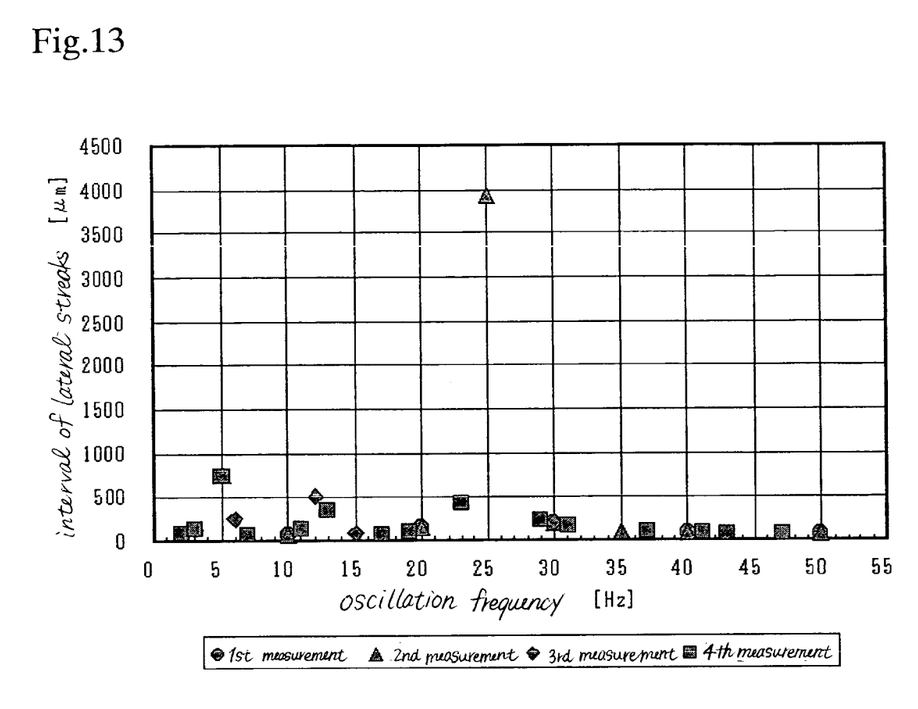
FIG. 13 is a graph showing a relationship between an oscillation frequency and an interval of lateral streaks in setting a shot number according to a standard condition.

The relation of the cycle of the lateral streak to the oscillation frequency calculated from Formula 2 is shown in FIG. 13. A characteristic peak appears when the oscillation frequency ω is 25 Hz, and it is predicted that the interval between the lateral streaks at 25 Hz is about 3.9 mm. When the oscillation frequency is not 25 Hz, the interval is within a range about from 60 μm to 500 μm. The estimated scanning rate of the substrate at 25 Hz is 0.833 mm/sec when the shot number matches the shot number under the standard conditions (30 Hz, 1.0 mm/sec).

[Embodiment 2]

In the present embodiment, one example of the laser apparatus according to the present invention, shown in Embodiment Mode, will be given.

Figure 7:
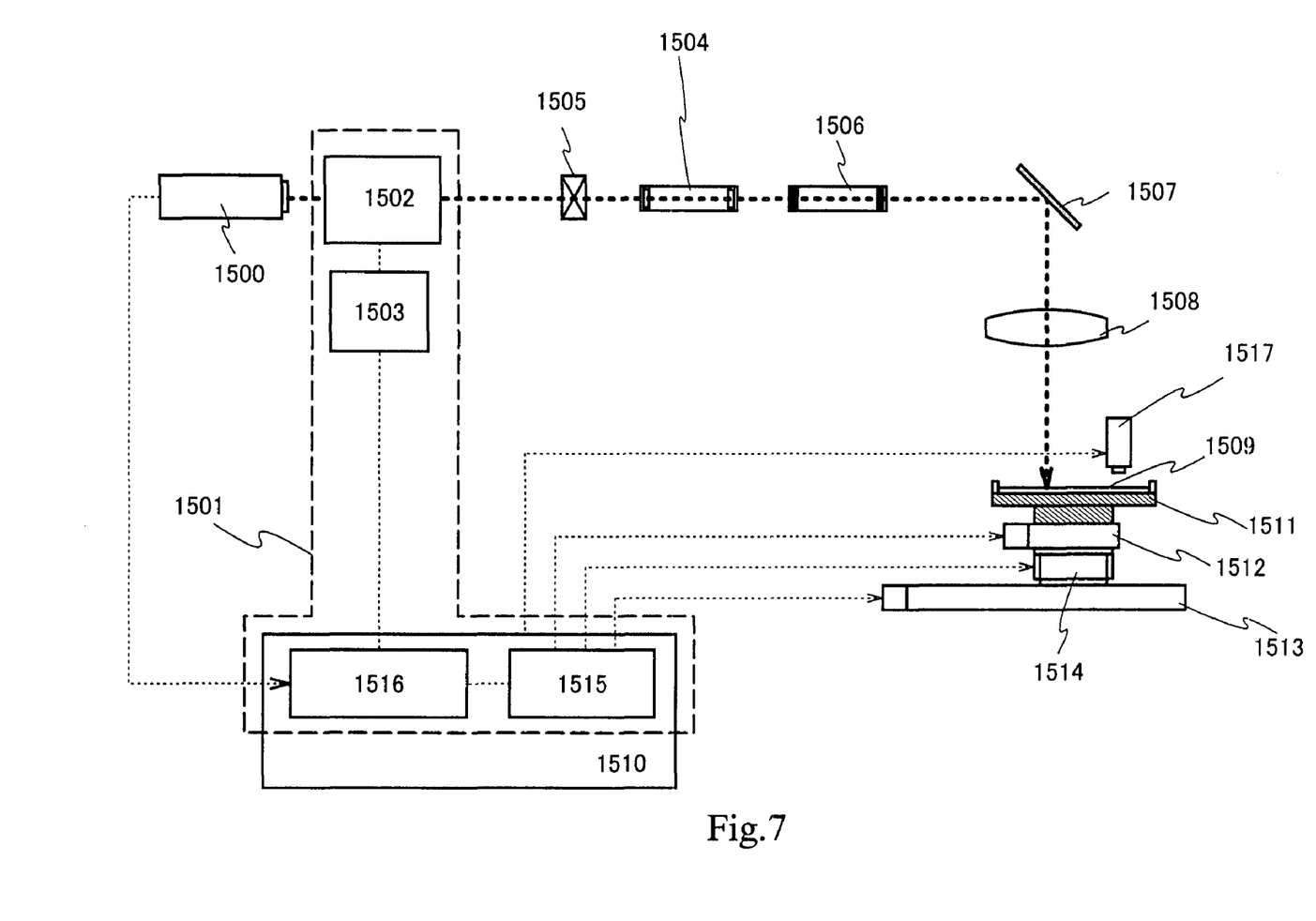
FIG. 7 is a diagram showing a structure of a laser apparatus according to the present invention.

FIG. 7 shows a structure of a laser apparatus according to the embodiment. A part of a laser beam emitted from an oscillator 1500 is sampled in an optical system 1502. The sampled laser beam is made to go into a sensor 1503.

On the other hand, the rest of the laser beam, except the sampled laser beam, is made to go into a beam expander 1504. Although a shutter 1505 for blocking a laser beam is provided between the oscillator 1500 and the beam expander 1504 in the embodiment, it is not always necessary to provide the shutter.

The beam expander 1504 suppresses expansion of the incident laser beam, and at the same time, the size of a beam spot can be adjusted.

The laser beam irradiated from the beam expander 1504 is condensed in a beam homogenizer 1506 to have a beam spot with a rectangular, oblong or linear shape. The condensed laser beam is reflected off at a mirror 1507 and made to go into a lens 1508. The incident laser beam is again condensed with the lens 1508 and irradiated to a substrate 1509 with a semiconductor film formed. In the embodiment, a cylindrical lens is used as the lens 1508.

The substrate 1509 is set on a stage 1511 and the position of the stage 1511 is controlled with three position control means (drivers) 1512 to 1514. Specifically, the stage 1511 can be rotated with a φ direction position control means 1512 in a horizontal plane. Further the stage 1511 can be moved in an X direction with an X direction position control means 1513 in the horizontal plane and in a Y direction with a direction position control means 1514 in the horizontal plane. Operations of the position control means are controlled with a stage driver 1515 of a central processing unit 1510.

It is possible to control a position in the substrate 1519, to which the laser beam is irradiated, by controlling the above three position control means.

On the other hand, the sampled laser light is converted into an electrical signal in the sensor 1503, and the electrical signal is input into a signal processing unit 1516. The electrical signal has a state of fluctuation in energy of the laser beam as data. In the signal processing unit 1516, signal processing is performed to analyze the data, and then the state of the fluctuation in energy of the laser beam is grasped.

From the oscillator 1500, a standard signal in synchronization with the oscillation of the laser beam is input into the signal processing unit 1516, which controls the stage driver 1515 with information such as the grasped state of the fluctuation (including periodic frequency), the standard signal, and the ratio of energy of the sampled laser beam of the laser beam emitted from the oscillator to control a speed of the stage 1511 in order to move the stage 1511 in phase with the state of the fluctuation.

Specifically, operations of the three position controlling means above may be controlled in order to change a relative moving rate of the beam spot to the substrate 1509 in a scanning direction in phase with the fluctuation in energy of the laser beam.

It is noted that the optical system 1502, the sensor 1503, and the signal processing unit 1516 are included in the correcting means 1501 according to the present invention, which may further include the stage driver 1515.

Besides, a monitor 1517 with a photo acceptance unit such as a CCD (Charge-Coupled Device) may be provided to grasp the position of the substrate accurately.

The present embodiment can freely be implemented with Embodiment 1.

When a scanning speed of a laser beam is controlled according to the present invention, a process to an object can be performed more uniformly than the conventional means with the wave transducer.

What is claimed is:

1. A laser irradiation method comprising a step of controlling a relative speed of a beam spot of a laser beam to an object so that at least a frequency and an amplitude of fluctuation in energy of the laser beam are in phase with the fluctuation in energy of the laser beam.

2. A laser irradiation method comprising:
sampling a part of a laser beam emitted from an oscillator;
generating an electric signal including fluctuation in energy of the laser beam as data;
performing signal processing to the electric signal to grasp a state of the fluctuation in energy of the laser beam; and
controlling a relative speed of a beam spot of the laser beam to an object so as to be in phase with the fluctuation in energy of the laser beam.

3. The laser irradiation method according to claim 2, wherein the signal processing is Fast Fourier transformation.

4. A laser irradiation method comprising:
sampling a part of a laser beam emitted from an oscillator;
generating an electric signal including fluctuation in energy of the laser beam as data;
performing signal processing to the electric signal to grasp a state of the fluctuation in energy of the laser beam; and
controlling a position of an object so that a relative speed of a beam spot of the laser beam to the object is in phase with the fluctuation in energy of the laser beam.

5. The laser irradiation method according to claim 4, wherein the signal processing is Fast Fourier transformation.

6. A laser irradiation method comprising:
sampling a part of a laser beam emitted from an oscillator;
generating an electric signal including fluctuation in energy of the laser beam as data;
performing signal processing to the electric signal to grasp a state of the fluctuation in energy of the laser beam; and controlling a position of a beam spot of the laser beam so that a relative speed of the beam spot to an object is in phase with the fluctuation in energy of the laser beam, wherein a position of the object is fixed.

7. The laser irradiation method according to claim 6, wherein the signal processing is Fast Fourier transformation.

8. A method of manufacturing a semiconductor device, comprising:

sampling a part of a laser beam emitted from an oscillator, generating an electric signal including fluctuation in energy of the laser beam as data from the part of the laser beam;

performing signal processing to the electric signal to grasp a state of the fluctuation in energy of the laser beam;

controlling a relative speed of a beam spot of the laser beam to a semiconductor film so as to be in phase with the fluctuation in energy of the laser beam, and crystallizing the semiconductor film by irradiation of the laser beam.

9. The method of manufacturing a semiconductor device according to claim 8, wherein the signal processing is Fast Fourier transformation.

10. A method of manufacturing a semiconductor device, comprising:

sampling a part of a laser beam emitted from an oscillator;

generating an electric signal including fluctuation in energy of the laser beam as data from the part of the laser beam;

performing signal processing to the electric signal to calculate a frequency, an amplitude, and a phase of the fluctuation in energy of the laser beam;

controlling a position of a semiconductor film so that a relative speed of a beam spot of the laser beam to the semiconductor film is in phase with the fluctuation in energy of the laser beam; and crystallizing the semiconductor film by irradiation of the laser beam.

11. The method of manufacturing a semiconductor device according to claim 10, wherein the signal processing is Fast Fourier transformation.

12. A laser irradiation method comprising a step of controlling a relative speed of a beam spot of a laser beam to an object so as to be in phase with fluctuation in energy of the laser beam.

* * * * *